US012664779B2

(12) United States Patent
Shah

(10) Patent No.: US 12,664,779 B2
(45) Date of Patent: Jun. 23, 2026

(54) SYSTEM AND METHOD FOR AUTOMATIC IDENTIFICATION OF SPATIAL/TEMPORAL ATTENTION REGIONS AND TRAINING DATA GENERATION USING THE SAME

(71) Applicant: YAHOO ASSETS LLC, New York, NY (US)

(72) Inventor: Avijit Shah, Santa Clara, CA (US)

(73) Assignee: YAHOO ASSETS LLC, New York, NY (US)

( * ) Notice: Subject to any disclaimer, the term of this patent is extended or adjusted under 35 U.S.C. 154(b) by 216 days.

(21) Appl. No.: 18/584,401

(22) Filed: Feb. 22, 2024

(65) Prior Publication Data

US 2025/0272976 A1     Aug. 28, 2025

(51) Int. Cl.
*G06V 20/40*          (2022.01)
*G06V 10/774*        (2022.01)

(52) U.S. Cl.
CPC ............ *G06V 20/42* (2022.01); *G06V 10/774* (2022.01); *G06V 20/44* (2022.01); *G06V 20/46* (2022.01); *G06V 20/49* (2022.01)

(58) Field of Classification Search
CPC ........ G06V 20/42; G06V 20/49; G06V 20/46; G06V 10/774; G06V 20/44
See application file for complete search history.

(56) References Cited

U.S. PATENT DOCUMENTS

| | | | |
|---|---|---|---|
| 2019/0366153 A1* | 12/2019 | Zhang | ..................... G06V 10/82 |
| 2020/0298080 A1* | 9/2020 | Zhang | ..................... G06T 7/207 |
| 2023/0055636 A1 | 2/2023 | Cheng et al. | |
| 2023/0173367 A1* | 6/2023 | Marty | ................ A63B 24/0021 473/433 |

OTHER PUBLICATIONS

Hao et al., "Compact Bilinear Augmented Query Structured Attention for Sport Highlights Classification", MM '20: Proceedings of the 28th ACM International Conference on Multimedia, Oct. 12-16, 2020, pp. 628-636, Association for Computing Machinery, ACM Digital Library, Seattle, WA, USA.

Yang et al., "STA-CNN: Convolutional Spatial-Temporal Attention Learning for Action Recognition", IEEE Transactions on Image Processing, Apr. 7, 2020, pp. 5783-5793, vol. 29, IEEE.

Chan et al., "Human Action Recognition Based on Spatial-Temporal Attention", ICLR 2019 Conference Blind Submission, Sep. 27, 2018, pp. 1-10, OpenReview.

Non-Final Office Action issued Feb. 20, 2026 in U.S. Appl. No. 18/584,428.

* cited by examiner

*Primary Examiner* — David F Dunphy
(74) *Attorney, Agent, or Firm* — Venable LLP

(57) ABSTRACT

The present teaching relates to identify events of interests. Given each of video clips, each capturing an event of interest, spatial attention regions are identified therefrom, each of which includes objects that meet a first condition. A temporal attention region is determined in each video clip according to a second condition. An action that causes an event of interest in the temporal attention region is labeled. The video clips, the respective spatial/temporal attention regions, and the action labels are then used to generate training data for machine learning of models for automatically determining, from an input video clip, a temporal attention zone for an event of interest and an action that causes the event of interest.

20 Claims, 12 Drawing Sheets

100

Retrieve training data Samples 260

Obtain features for training samples 265

Train models of attention zone & action type 270

Receive a new video clip 275

Extract feature vectors from the video clip 280

Predict attention zone & action type via models 285

Process an input historic video clip 305

Detect specified objects via object detection models 315

Identify spatial regions via action event configuration 325

Detect temporal attention based on domain info 335

Output spatial/temporal attention regions for clip 345

1

SYSTEM AND METHOD FOR AUTOMATIC IDENTIFICATION OF SPATIAL/TEMPORAL ATTENTION REGIONS AND TRAINING DATA GENERATION USING THE SAME

CROSS REFERENCE TO RELATED APPLICATION

The present application is related to U.S. application Ser. No. 18/584,428, entitled "SYSTEM AND METHOD FOR SIMULTANEOUS TEMPORAL ATTENTION ZONE AND ACTION TYPE PREDICTION AND APPLICATIONS THEREOF", filed on Feb. 22, 2024, the contents of which are hereby incorporated by reference in its entirety.

BACKGROUND

1. Technical Field

The present teaching generally relates to computers. More specifically, the present teaching relates to electronic content processing.

2. Technical Background

With the development of the ubiquitous electronics, much of the content is nowadays electronic, which includes texts, audios, images, videos, or multimedia incorporating multiple types of media content. Electronic content may be consumed by users via some interfaces on different types of electronic devices. It may also be analyzed using computing devices to identify information relevant for different purposes. The progress made in the field of signal processing has enabled different approaches to automatically extract relevant information to help users to quickly focus on the information that is relevant to what they are looking for. This is particularly so when machine learning is used to train models that captures the knowledge needed to identify needed information from large amount of electronic content.

However, for some applications based on some types of electronic content, it remains challenging to automatically extract information from electronic content. One particularly challenging field relates to videos. The number of bits needed to represent a video clip is very high so that being able to narrow down useful information in a portion of a video may be very helpful. For instance, a video recording of a sports game may long, extending to, e.g., several hours. Sports lovers, athletes, or coaches may be most interested in a handful of small clips where some meaningful events (e.g., touchdowns) occurred. Although a person may readily detect such a defined event or action based on visual observation of the video, it is tedious and time consuming. Automatically identifying the same via signal processing so far remains challenging.

Thus, there is a need for a solution that can tackle the issue associated with the conventional approach to extract information of interest from electronic content.

SUMMARY

The teachings disclosed herein relate to methods, systems, and programming for information management. More particularly, the present teaching relates to methods, systems, and programming related to content processing and categorization.

In one example, a method, implemented on a machine having at least one processor, storage, and a communication platform capable of connecting to a network for identifying events of interests. Given each of video clips, each capturing an event of interest, spatial attention regions are identified therefrom, each of which includes objects that meet a first condition. A temporal attention region is determined in each video clip according to a second condition. An action that causes an event of interest in the temporal attention region is labeled. The video clips, the respective spatial/temporal attention regions, and the action labels are then used to generate training data for machine learning of models for automatically determining, from an input video clip, a temporal attention zone for an event of interest and an action that causes the event of interest.

In a different example, a system is disclosed for identifying events of interests. The system includes an S/T attention segmentation unit and an action labeling unit. The S/T attention segmentation unit is for identifying, from each of video clips capturing an event of interest, spatial attention regions, each of which includes objects that meet a first condition. A temporal attention region is also determined in each video clip according to a second condition. The action labeling unit is for labeling an action that causes an event of interest in the temporal attention region and for generating, based on video clips, the respective spatial/temporal attention regions, and the action labels, training data for machine learning of models for automatically determining, from an input video clip, a temporal attention zone for an event of interest and an action that causes the event of interest.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for identifying events of interests. Given each of video clips, each capturing an event of interest, spatial attention regions are identified therefrom, each of which includes objects that meet a first condition. A temporal attention region is determined in each video clip according to a second condition. An action that causes an event of interest in the temporal attention region is labeled. The video clips, the respective spatial/temporal attention regions, and the action labels are then used to generate training data for machine learning of models for automatically determining, from an input video clip, a temporal attention zone for an event of interest and an action that causes the event of interest.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
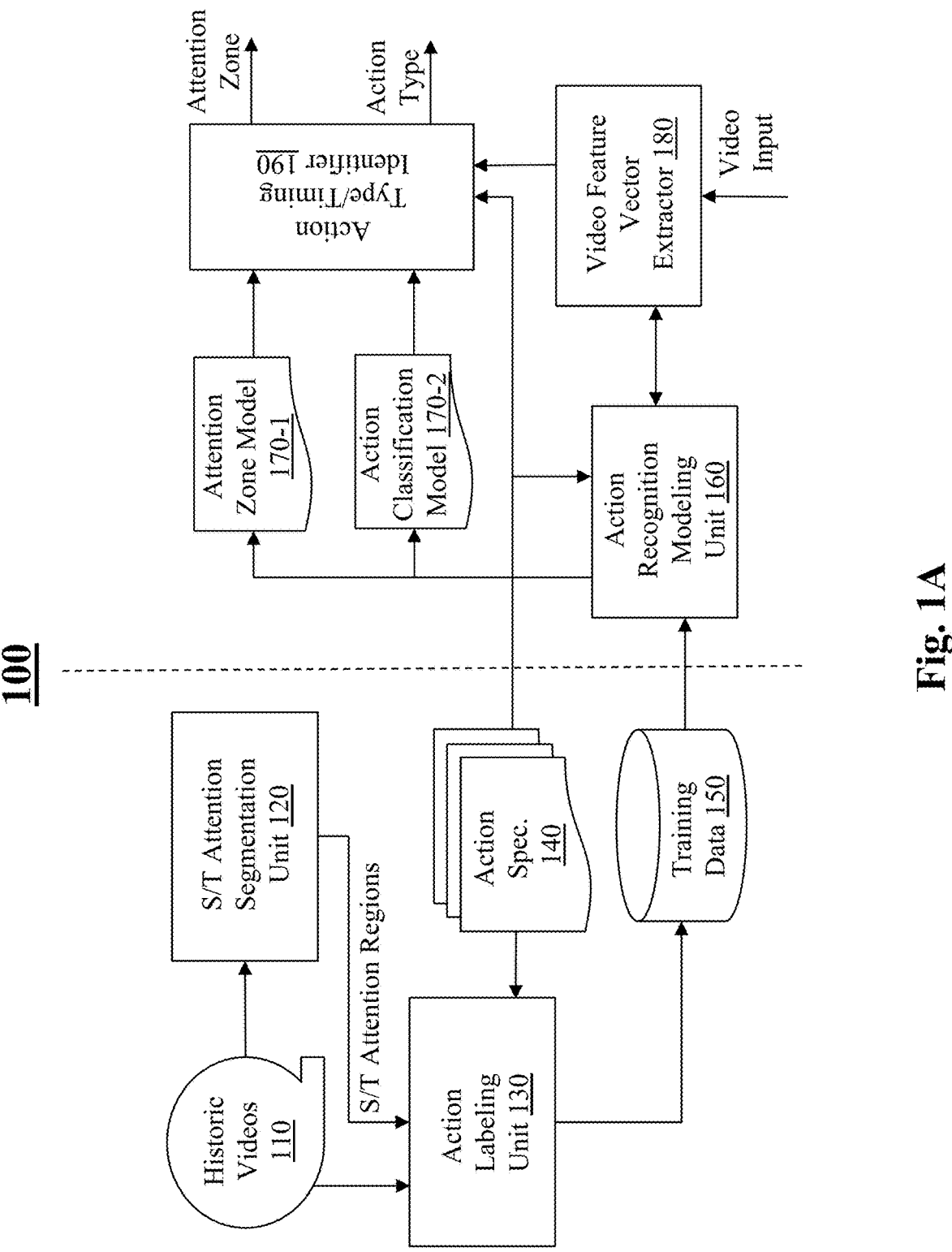
FIG. 1A depicts an exemplary framework for semi-automatically generating action-related training data used in training models for extracting portions of video clips corresponding to specified actions, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses different aspects of a framework for extracting portions of video clips containing some defined actions. The first aspect of the teachings relates to identifying, semi-automatically, appropriate portions in video clips as corresponding to some defined events/actions represented based on automatically detected spatial/temporal (S-T) attention regions. The second aspect of the teachings relates to utilizing the training data generated by the first aspect of the teachings to simultaneously train models, via machine learning, for detecting a temporal attention region in a video clip corresponding to an event of interest and recognizing the action type involved in the event. For example, an event of interest may be a basket event (a basketball enters a basket in a basketball game) to be identified from a video clip. There may be different types of actions involved in an event of interest. Taking the example of basket event occurring in a basketball game, the types of action (e.g., different actions that caused a basketball to enter a basket) associated with such an event may include dunk, layup, hoop, and 3-pointer. That is, the second aspect of the present teachings is to simultaneously isolate the frames of a video clip (temporal attention) corresponding to an occurrence of an event of interest and recognize the type of action (classification) that causes the event of interest.

In some embodiments, the first aspect of the teachings to generate training data from video clips may be implemented in different stages. In the first stage, based on a video clip, spatial attention regions in different frames of the video clip may be automatically identified by detecting objects of interests associated with the event of interest. For example, if an event of interest is a basket event in a basketball game, the object of interest may include a basket and a basketball. A spatial attention region in a frame is one where both a basket and a basketball are detected. In the second stage, a temporal attention region may be automatically selected as consecutive frames in the video clip with spatial attention regions satisfying some criteria determined according to, e.g., domain knowledge about the event of interest. For instance, if a frame has detected objects of interest (basket and basketball) overlapping indicating a basket event, a certain number of frames consecutive to the frame, e.g., some prior and some after, may be selected according to some domain knowledge as the corresponding temporal attention region in the video clip that describes the event of interest.

Each event of interest automatically detected according to the present teaching may be associated with a corresponding action that causes the event. For instance, any of the actions of dunk, layup, hoop, and 3-pointer may cause a basket event. To create training data for machine learning simultaneously models for extracting temporal attention region of a video clip for an event of interest and recognizing the type of action associated with the event, each video clip with detected spatial/temporal attention regions may be provided with a label representing the type of action occurred during the event. In some embodiments, this may be performed by users and, hence, the training data is created semi-automatically. Such a user create label specifying the action type may be used as a ground truth label so that the training data may be used to carry out supervised learning to machine train the models.

Such created training data in the first aspect of the present teachings includes multiple training samples, each of which may include a video clip, spatial/temporal attention regions identified from the video clip representing a detected event of interest, and a label of an action associated with the event of interest. The training data may then be used by the second aspect of the present teachings to derive models for detecting a temporal attention region in an input video clip representing an event of interest and for recognizing the type of an action involved in the detected event of interest. In some embodiments, the models may be trained simultaneously using a joint loss function that considers the loss associated with the training of each model so that both models may be optimized at the same time. With the trained models, when a new video clip is received, both models are utilized to simultaneously detect a temporal attention region across some consecutive frames in the input video clip as a detected event of interest and recognize a type of an action involved in the detected event.

Figure 1B:
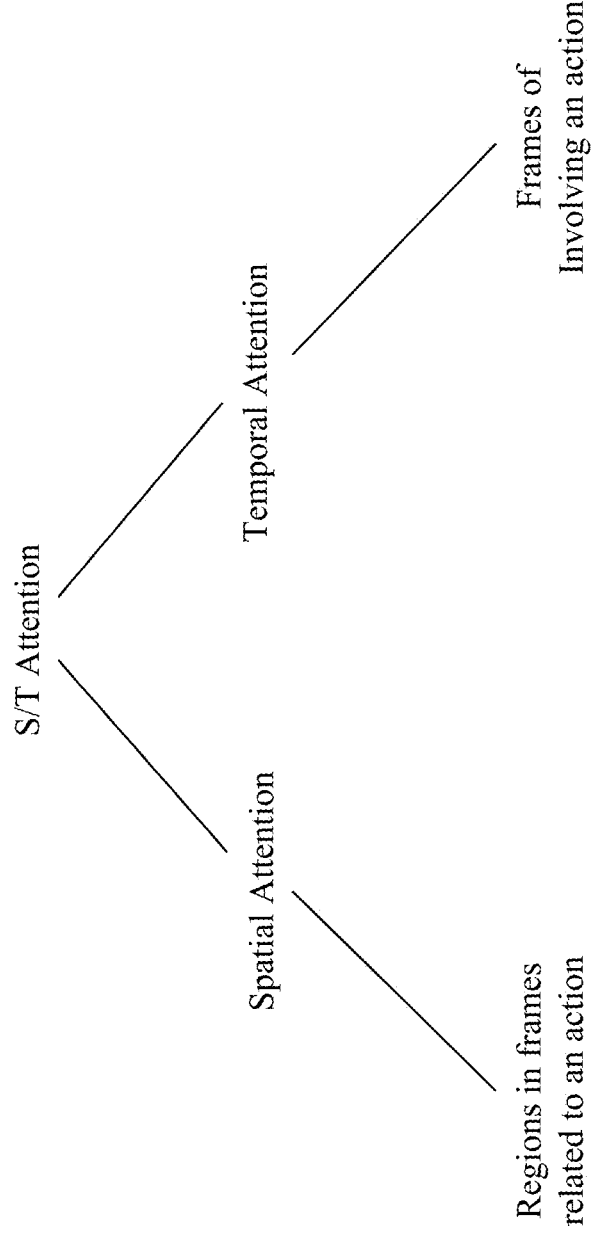
FIG. 1B illustrates exemplary content related to spatial/temporal (S/T) attention, in accordance with an embodiment of the present teaching.

FIG. 1A depicts an exemplary framework 100, in accordance with an embodiment of the present teaching. As discussed herein, the framework 100 includes two parts, one being on the left of the dotted line and the other on the right of the dotted line in FIG. 1A. The first part on the left is for semi-automatically generating action-related training data used for machine learning models. The second part on the right is for training models using the training data for identifying a temporal attention region in an input video clip corresponding to an event of interest and classifying an action associated with the event. As illustrated, the first part comprises a spatial/temporal (S/T) segmentation unit 120 and an action labeling unit 130. The S/T segmentation unit 120 is provided to automatically segment a historic video clip from 110 to identify regions of interest (ROIs or spatial attention region) in consecutive frames (a temporal attention region) that correspond to an event visually presented in the video clip. This is illustrated in FIG. 1B, where S/T attention includes spatial attention(S), corresponding to regions in frames corresponding to an action, and temporal attention (T), corresponding to frames involving an action that causes an event. That is, the S/T segmentation unit 120 detects spatial and temporal (S/T) attention regions from frames of a given video clip corresponding to a specified event.

The action labeling unit 130 may be provided for selecting a label corresponding to an action that caused each event detected by the S/T attention segmentation unit 120. For instance, if an event is a basket event, there may be different types of actions that can cause a basket event, including dunk, layup, hoop, and 3-pointer. Possible actions associated with a defined event (represented by the S/T attention regions) may be specified in 140 with corresponding labels for such actions. In operation, based on a detected event from a video clip, the action labeling unit 130 may determine a label of an action that caused the event and assign the label to the event. In some embodiments, the label may be determined by, e.g., detecting the action and its type thereof and the determination may be carried out in different operational modes, e.g., automatically, semi-automatically, or manually by a human. Once the action type is determined, a label corresponding to the type of action may be used to label the event.

Figure 1C:
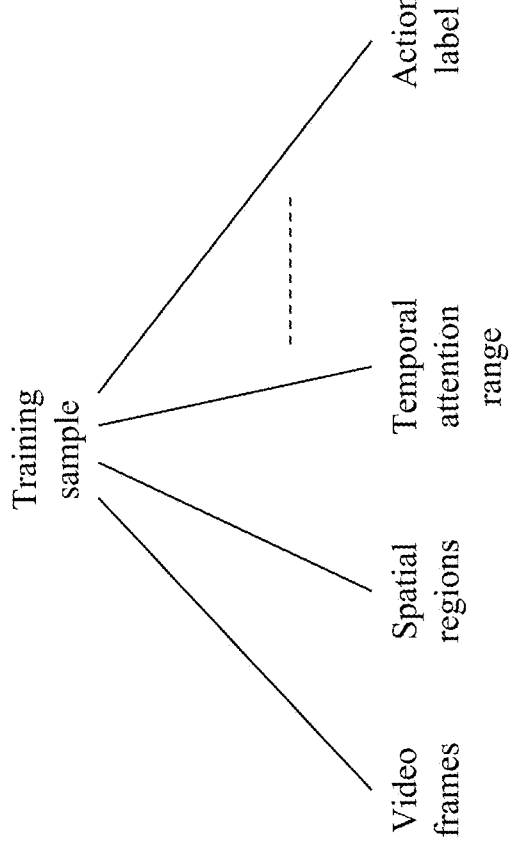
FIG. 1C illustrates exemplary content included in each sample of training data, in accordance with an embodiment of the present teaching.

The labeled events created based on historic video clips (110) may then be stored as training data 150 for machine learning conducted in the second part of the framework 100. The training data 150 includes a plurality of training samples, each of which may be constructed as illustrated in FIG. 1C, where each training sample includes the video frames in the video clip, representations of spatial regions (e.g., a ROI) in different frames, a representation of a temporal attention range indicative of, e.g., a consecutive number of frames, and an action label indicating the type of action that causes the detected event. Such training data may be used to train simultaneously two models, one for detecting a temporal attention zone in a video clip representing the time frame of a detected event and the other for detecting a type of action occurred in the video clip that caused the event.

As shown in FIG. 1A, based on the training data 150, machine learning may be carried out, by the second part of the framework 100, to obtain the models for identifying, based on an input video clip, a temporal attention region corresponding to an action that causes an event of interest and classifying the action associated with the event. In this illustrated embodiment, the second part of the framework 100 comprises an action recognition modeling unit 160, a video feature vector extractor 180, and an action type/timing identifier 190. The action recognition modeling unit 160 is provided for utilizing the training data 150 in machine learning to derive an attention zone model 170-1 and an action classification model 170-2 via supervised training. With the trained models 170-1 and 170-2, the second part of the framework 100 utilizes the trained models to identify a section of a video input (e.g., clips) corresponding to an event of interest as well as the type of action that causes the event.

The video feature vector extractor 180 may be provided to take an input video clip and process the input video clip to extract different features needed for further processing. Based on the features extracted from the input video clip, the action type/timing identifier 190 is provided to detect an event of interest by identifying the temporal attention zone of the event as well as the type of action occurred in the video that led up to the event of interest. In some embodiments, the models 170-1 and 170-2 may be obtained via supervised training to learn the relationships between visual data and the event of interest as well as the action that causes the event based on various features captured in the video clips. In some implementations, feature extraction may be achieved using image processing techniques. In some implementations, feature extraction may be carried out by an artificial intelligence (AI) system trained on supervised data to learn knowledge related to the features of interest so that when an image is received, such features may be obtained by the trained system. In some embodiments, such an AI feature extraction system may produce embeddings representing the extracted image features.

In some embodiments, features extracted from a given video clip may include features from the segmented spatial regions in each frame and/or features with respect to each group of consecutive frames. In some embodiments, features across the entire image frames (i.e., not limited to the spatial regions) may be computed and utilized. In some embodiments, when features are computed across the entire image, features from the spatial regions and that from other nonspatial regions may be, e.g., weighed differently. In some situations, the features for each group of consecutive frames may be consolidated and used to capture the continuities of activities in the visual field in consecutive frames. In addition, by grouping features from different frames into a consolidated feature vector may also reduce the total number of feature vectors to be used for classification.

This may be useful when the video clips correspond to high frame rate videos. For example, for a video with a frame rate of 24 frames per second, features may be computed from the spatial attention region or the entire image in each frame may be extracted. If such features in every 8 consecutive frames are combined to generate a feature vector, then there will be 3 feature vectors obtained for each second of the video clip. If a video clip lasts 7 seconds, then there will be 21 feature vectors characterizing the video clip. Such feature vectors may be indexed, e.g., 0, 1, . . . , 20, and may be used for identifying the temporal attention region for an event as well as recognition of an action type. In this case, as the feature vectors are indexed, the temporal attention region/zone for an event may be identified based on the indices of the feature vectors. In some implementations, when the input video clips are of a known length (e.g., fixed length), visual feature extraction may also be learned implicitly via, e.g., embeddings. In some embodiments, visual feature extraction and recognition (of the temporal attention zone and the action type) may be learned as an integrated manner. That is, the video feature vector extractor 180 and the action type/timing identifier 190 may be of an integral unit that takes a video clip as an input and process to yield results of attention zone and action type based on the trained model 170-1 and 170-2.

Figure 2A:
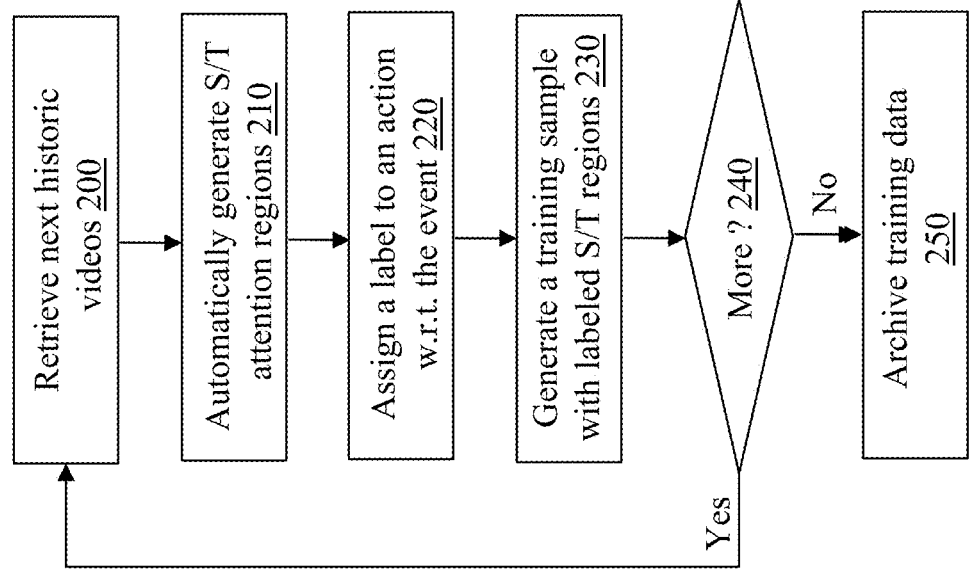
FIG. 2A is a flowchart of an exemplary process for semi-automatically generating training data, in accordance with an embodiment of the present teaching.

FIG. 2A is a flowchart of an exemplary process of the first part of framework 100 for generating training data, in accordance with an embodiment of the present teaching. In this process of creating training data, when a historic video clip is retrieved at 200 from 110, the S/T attention segmentation unit 120 automatically generates, at 210, spatial and temporal attention regions identified from the historic video clip. The S/T attention regions so detected may then be used by the action labeling unit 130 to assign a label to an action associated with the event of interest. As disclosed herein, in some embodiments, the labeling process may be a manual or semi-automatic so that the action type may be recognized by a human and then accordingly provide a label to indicate that the event detected is due to a specific action as labeled as such. Based on the S/T attention regions represent the detected event and the label assigned to the action, a training sample related to the historic video clip is generated at 230. The process of generating supervised training samples continues until, determined at 240, all historic video clips are processed for generating a supervised training sample. Such created training samples are then archived as training data in storage 150.

Figure 2B:
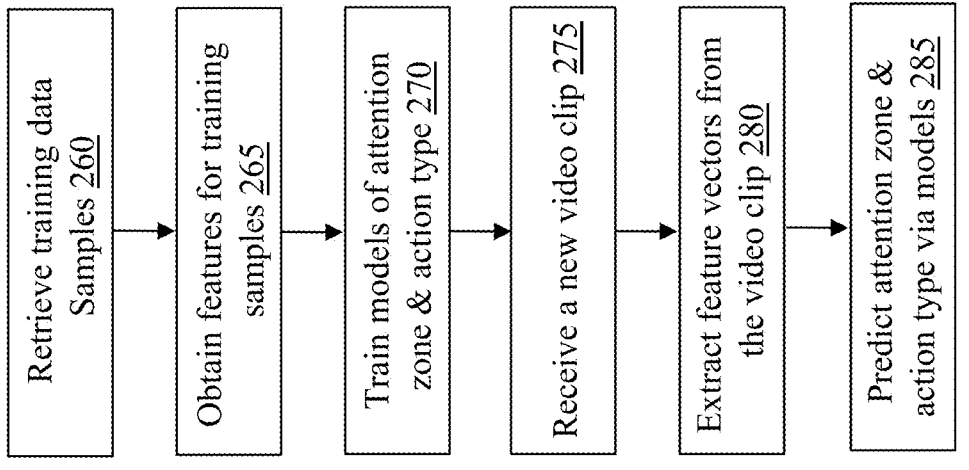
FIG. 2B is a flowchart of an exemplary process of using semi-automatically generated training data with S/T attention regions to train models for simultaneously predicting attention regions as well as type of action occurred in the attention regions, in accordance with an embodiment of the present teaching.

FIG. 2B is a flowchart of an exemplary process of the second part of framework 100 for using supervised training data with labeled S/T attention regions to obtain models for simultaneously predicting attention regions as well as type of action occurred in the attention regions, in accordance with an embodiment of the present teaching. In operation, when the training samples in 150 are retrieved at 260, the video feature vector extractor 180 may be invoked to obtain, at 265, features from each of the training sample. With the ground truth events represented by the S/T attention regions as well as the ground truth labels for the actions associated with the events, the action recognition modeling unit 160 trains simultaneously, at 270, the attention zone model 170-1 and the action classification model 170-2 via supervised training. With the trained models, when a new video clip is received at 275, the video feature vector extractor 180 is activated to extract, at 280, features from the new video clip, which are then used by the action type/timing identifier 190 to predict, at 285, the temporal attention zones based on the extracted features in accordance with the trained models 170-1 and 170-2. Below, details related to the S/T attention segmentation unit 120 and the action recognition modeling unit 160 are provided with reference to FIGS. 3A-6.

Figure 3A:
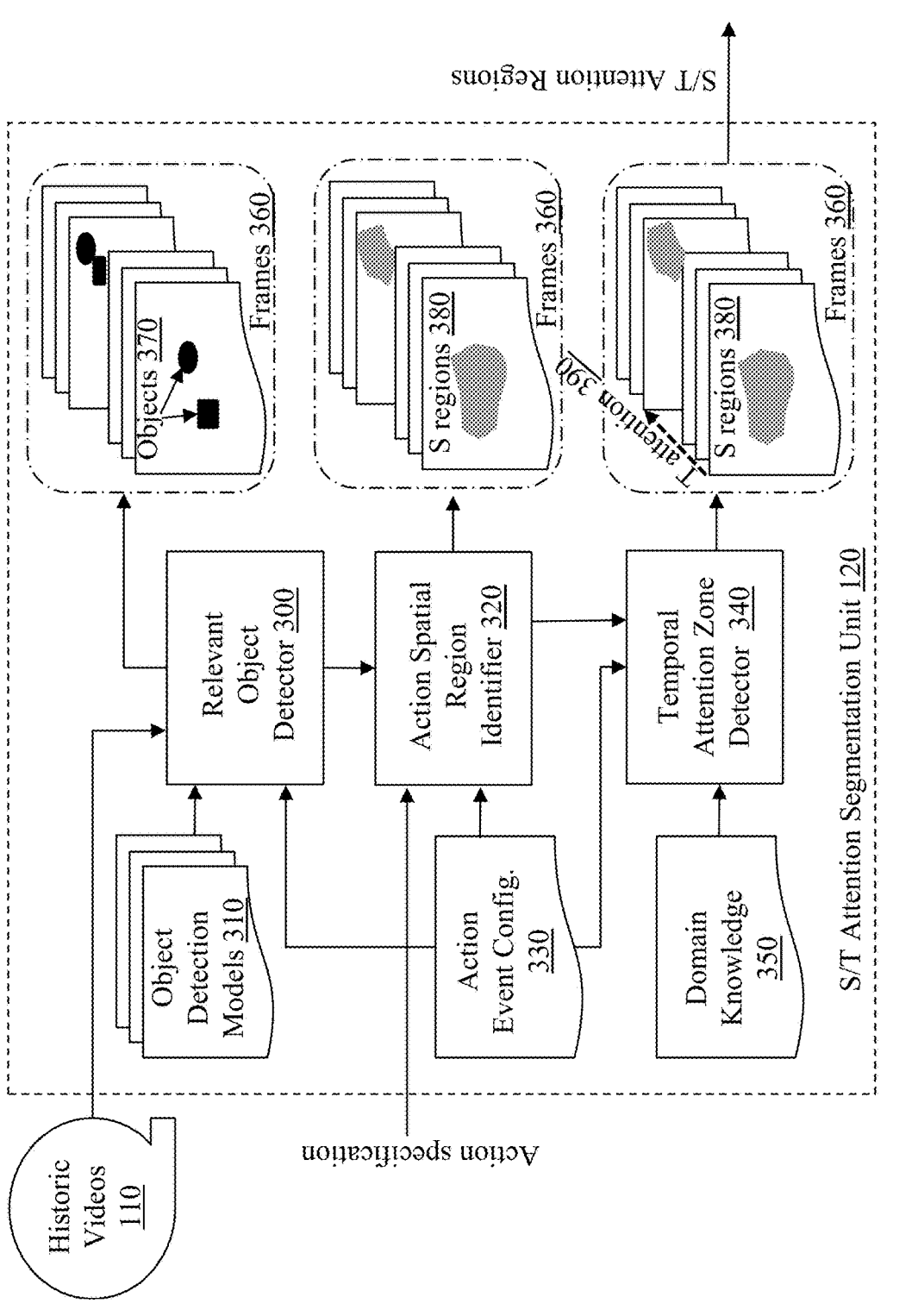
FIG. 3A depicts an exemplary high level system diagram of a S/T attention segmentation unit, in accordance with an embodiment of the present teaching.

FIG. 3A depicts an exemplary high level system diagram of the S/T attention segmentation unit 120, in accordance with an embodiment of the present teaching. As discussed herein, the S/T attention segmentation unit 120 takes historic video clips in 110 as input and outputs spatial/temporal attention regions for each historic video clip to represent an event of interest detected from the historic video clip. In this illustrated embodiment, the S/T attention segmentation unit 120 comprises a relevant object detector 300, an action spatial region identifier 320, and a temporal attention zone detector 340. The relevant object detector 300 is provided for detecting some objects of interest relating to the event to be detected. For instance, if an event of interest is a basket event, the objects of interest may be defined as a basket and a basketball. Such objects of interest are relevant because they correspond to building blocks of the event, i.e., a basket event involves a detected basket and a detected basketball in a vicinity of the detected basket.

While relevant objects may be defined with respect to an event of interest, the event of interest may be deemed as occurring when the relevant objects form some spatial relations. For instance, if an event of interest is a basket event and the relevant objects involved in a basket event may include a basket and a basketball, then the basket event may be identified when the two relevant objects, i.e., the basket and the basketball, form a spatial relationship of intersection, i.e., when the basketball enters the basket. Such conditions that define an event of interest based on relevant objects may be specified and configured in 330, which may be used by the relevant object detector 300 to determine the relevant object(s) to be detected as specified. The output of the relevant object detector 300 includes detected objects 370 in different frames of the historic video clip, as shown in FIG. 3A. In this illustration, two different relevant objects are detected in different frames, one represented by a rectangular and the other by an ellipse in different frames.

In some embodiments, with the relevant objects 370 detected, the action spatial region identifier 320 may identify spatial regions 380 (S) in such frames that correspond to a ROI in each frame that encompasses the detected relevant objects. In some embodiments, the spatial attention regions may correspond to those that meet certain conditions. For instance, a basket event may be defined when relevant objects, i.e., the basket and the basketball, intersect. Given that, a spatial attention region may be detected when the distance between the relevant objects satisfies a certain criterion, e.g., the distance is smaller than a certain threshold. That is, for frames where the distance between the basket and the basketball is too far, no spatial attention region is identified and only when the two are relatively close, the region in a frame that encompasses both relevant objects may be deemed as a spatial attention region. Such conditions for detecting a spatial attention region may also be specified in the action event configuration 330 and may be used by the spatial region identifier 320 to identify spatial attention regions in different frames that may lead up to the event of interest.

Such derived spatial attention regions in different frames are provided to the temporal attention zone detector 340 to identify a temporal attention region 390 as shown in FIG. 3A that corresponds to the event of interest according to some conditions specified for the event. A temporal attention region 390 includes consecutive frames identified as representing the visual information of the event. In some embodiments, the temporal attention region 390 may be determined in a multi-stage processing. In some embodiments, this includes a first step for identifying a key frame that satisfies the condition of the event of interest and a second step for determining consecutive frames around the key frame, including, e.g., frames before and after the key frame as the temporal attention region 390. Such consecutive frames encompass the entire event of interest, e.g., right before the point of time the event occurs and just after the event ends. In some embodiments, the consecutive frames around the key frame may be determined based on, e.g., some domain knowledge 350 defined in accordance with the event of interest. For example, for a basket event, based on known knowledge of typical time for the basket event to occur and the frame rate of the video clip, the temporal attention region in time may be identified based on X number of frames prior and after the key frame. If an event of interest is a touchdown, the domain knowledge about that sports game may differ and a temporal attention region may accordingly used to select the frames thereof. As shown in FIG. 3A, the spatial attention regions 380 are processed by the temporal attention zone detector 340 to determine the temporal attention region 390 and both the spatial attention regions and the temporal attention regions so identified from a historic video clip may then be output.

Figure 3B:
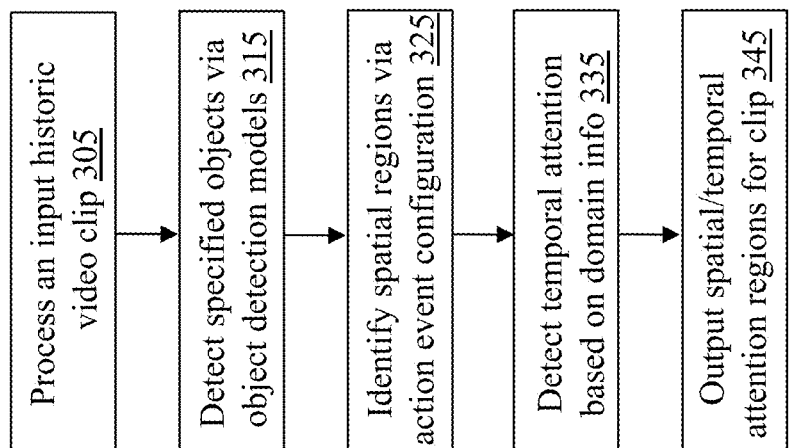
FIG. 3B is a flowchart of an exemplary process of a S/T attention segmentation unit, in accordance with an embodiment of the present teaching.

FIG. 3B is a flowchart of an exemplary process of the S/T attention segmentation unit 120, in accordance with an embodiment of the present teaching. When a historic video clip is received, it is processed at 305 and the relevant object detector 300 detects, at 315, objects relevant to an event of interest based on, e.g., object detection models 310, to output detected objects 370. Based on the detected objects, the action spatial region identifier 320 may extract, at 325, spatial attention regions 380 in video frames. In some embodiments, the spatial attention regions may be identified according to some criterion defined in connection with the event of interest, as discussed herein. The temporal attention zone detector 340 may then detect, at 335, the temporal attention region 390 by identifying frames based on the domain knowledge 350. Such identified spatial/temporal attention regions for the historic video clip are then output at 345. The operation as described in FIG. 3B may be applied to all historic video clips to generate S/T regions therefor to represent the events of interest.

Figure 4:
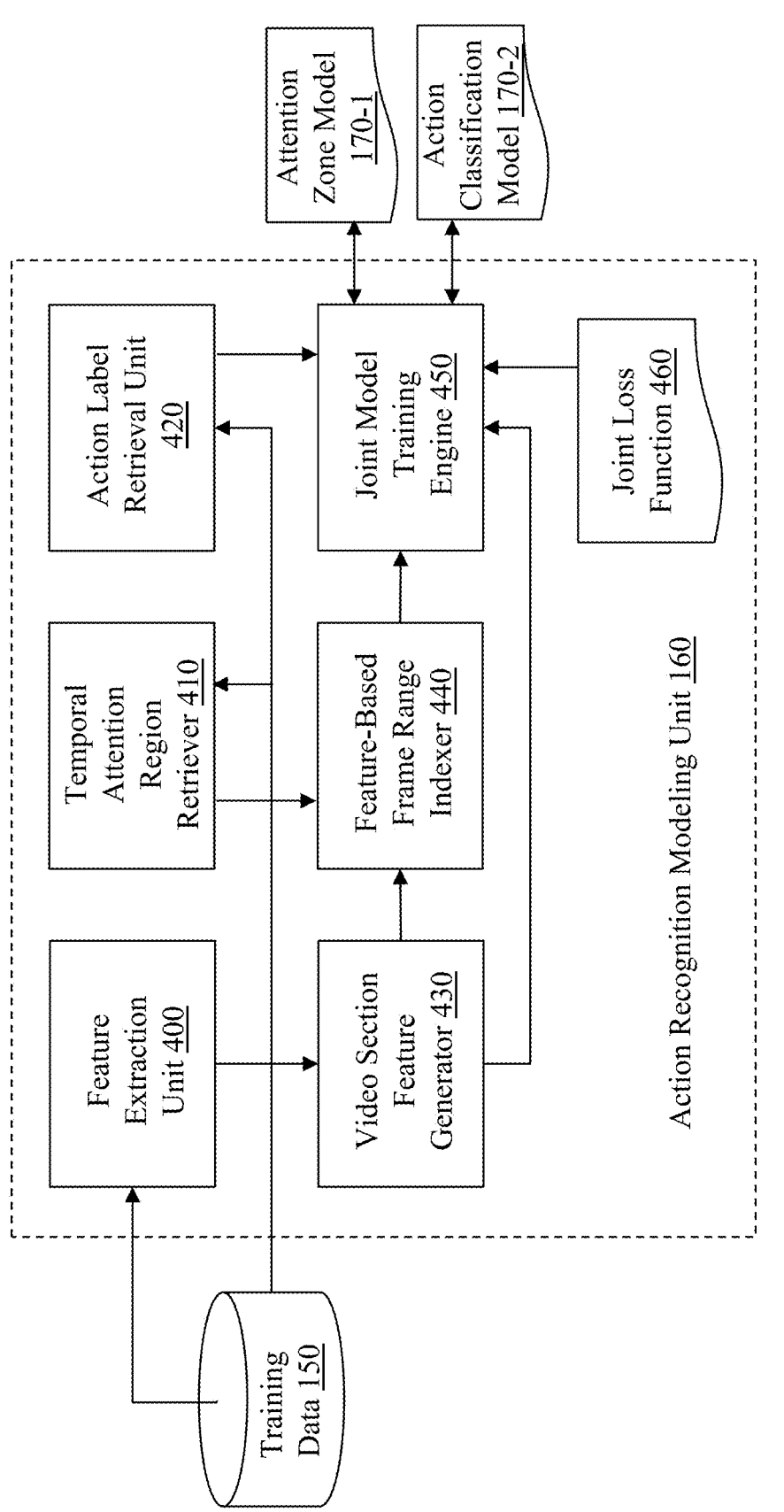
FIG. 4 depicts an exemplary high-level system diagram of an action recognition modeling unit, in accordance with an embodiment of the present teaching.

As discussed herein, for each event of interest detected, there is an action that caused the event. To create training data for machine learning models for detecting event of interest and action type, the detected events from historic video clips are to be assigned with labels representing the action types. Such training data 150 may then be used by the action recognition modeling unit 160 for training the attention zone model 170-1 and the action classification model 170-2. FIG. 4 depicts an exemplary high-level system diagram of the action recognition modeling unit 160, in accordance with an embodiment of the present teaching. The action recognition modeling unit 160 takes each training samples in training data 150, extracts ground truth labels on the temporal attention region and the action, and carries out the supervised learning of the models. In this illustrated embodiment, the action recognition modeling unit 160 includes a feature extraction unit 400, a temporal attention region retriever 410, an action label retrieval unit 420, a video section feature generator 430, a feature-based frame range indexer 440, and a joint model training engine 450.

As shown in FIG. 1C, each training sample may include frames of a video clip, spatial attention regions 380 in each of the frames, the temporal attention region 390, and an action label. Based on the frames of a video clip and corresponding spatial attention regions 380, the feature extraction unit 400 may be provided to extract features from each spatial attention region in different frames. As discussed herein, features extracted from frames, i.e., either from spatial attention regions in individual frames or from an entire image of each frame, may be combined and the video section feature generator 430 may be provided for that purpose by taking features extracted from individual frames and generate feature vectors for different groups of consecutive frames to generate feature vectors for different groups of frames. As illustrated above, for a video clip with a frame rate of 24 frames per second, when every 8 frames form a group, the features extracted from these 8 consecutive frames may be used to form a feature vector. In this case, for each one second of video, there will be 3 feature vectors per second. The total number of feature vectors is determined based on the number of seconds of each video. For instance, if a video clip is 7 second long, then there are 21 feature vectors which may be indexed from 0 to 20.

The temporal attention region retriever 410 may be provided to retrieve, from each training sample, a ground truth temporal attention region corresponding to a group of frames, which may be used, by the feature-based frame range indexer 440, to identify indices of feature vectors that correspond to the ground truth temporal attention region. For example, if a temporal attention region is from frame 35 to frame 102, it maps to feature vector indices 4 to 12 corresponding to the ground truth temporal attention region. The identified feature vector indices for the ground truth temporal attention region may then be used by the joint model training engine 450 to train the attention zone model 170-1 according to the ground truth indices. Similarly, the action label retrieval unit 420 is provided for retrieving the ground truth action label from the training sample which is then used by the joint model training engine 450 to train the action classification model 170-2 according to the ground truth action labels.

Figure 5:
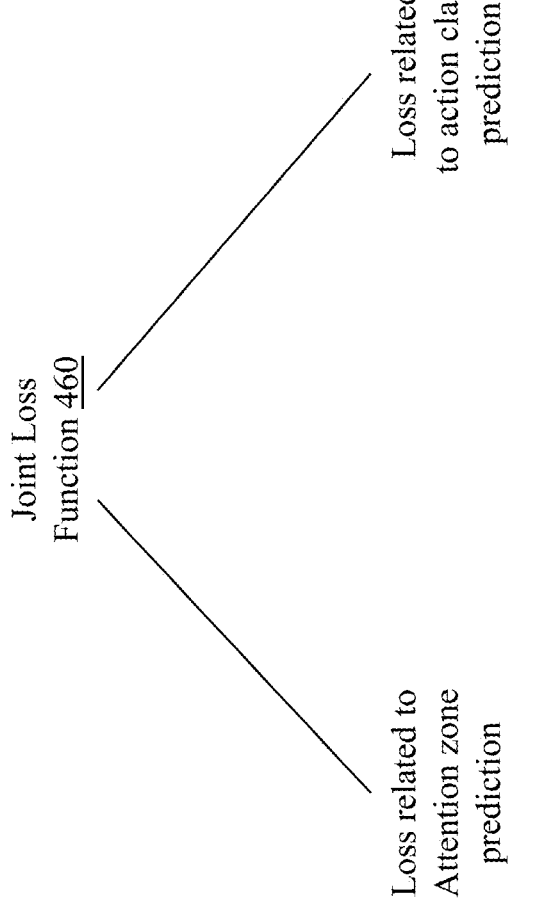
FIG. 5 shows an exemplary composition of a joint loss function, in accordance with an embodiment of the present teaching.

In some embodiments, the attention zone model 170-1 and the action classification model 170-2 may be implemented using an artificial neural network (ANN) such as a fully convolutional neural network trained based on feature vectors extracted from the training samples with ground truth temporal attention regions and action labels. In some implementation, the fully convolutional neural network may include different sub-nets, including a trained sub-net for predicting a temporal attention zone and another for predicting an action class associated with the temporal attention zone. The joint model training engine 450 may be provided for training the sub-nets simultaneously in a multi-layered scheme, including training each sub-net for different prediction tasks based on its respective loss function to optimize its performance and the entire ANN for both prediction tasks based on a joint loss function customized to consider both loss function value yielded in training the temporal attention zone prediction and that in training the action class prediction. This is illustrated in FIG. 5, where the joint loss function 460 determined during training may take into account both the loss related to the temporal attention zone prediction as well as the loss associated with action class prediction.

As discussed herein, a fully convolutional neural network may be employed as the models 170. In some implementations, such a fully convolutional neural network may also include some pooling layer(s) providing aggregation capabilities with respect to action class prediction. For example, feature vectors used for action class prediction may be pooled before the prediction so that emphasis may be placed on feature vectors that fall within the predicted temporal attention zone. That is, the prediction of the temporal attention zone may be used in action class prediction so that the quality of temporal attention zone prediction impacts that of the action class prediction. In implementation, the aggregation of feature vectors within the predicted temporal attention zone may be realized using any available techniques such as sub-events, average pooling, pyramid pooling, Gaussian attention pooling, etc.

Figure 6:
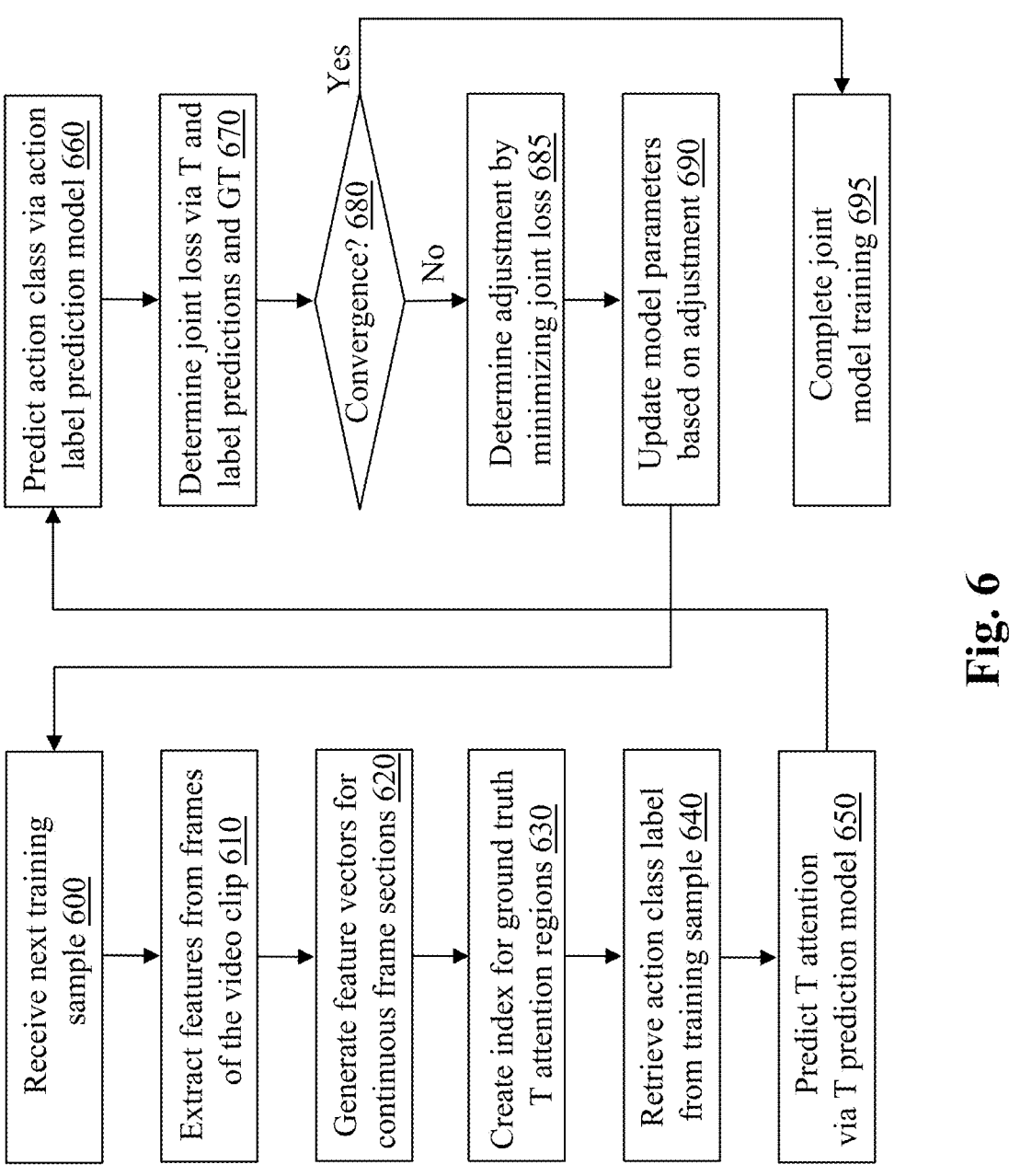
FIG. 6 is a flowchart of an exemplary process of an action recognition modeling unit, in accordance with an embodiment of the present teaching.

FIG. 6 is a flowchart of an exemplary process of the action recognition modeling unit 160, in accordance with an embodiment of the present teaching. In operation, when a training sample is received at 600, the feature extraction unit 400 extracts, at 610, features from each frame of the training video clip. The video section feature generator 430 generates, at 620, feature vectors for groups of frames based on the features extracted from individual frames. The feature vectors may then be sent to the feature-based frame range indexer 440 to create, at 630, indices to feature vectors corresponding to the ground truth temporal zone retrieved by the temporal attention region retriever 410 from the training sample. The action label extraction unit 420 then retrieves, at 640, the action label from the training sample.

The feature vectors corresponding to the ground truth for temporal attention zones, provided as, e.g., indices with respect to frames corresponding to the temporal attention regions, as well as ground truth action labels corresponding to the training samples may then be used for training. Based on each sample, the features and/or feature vectors generated based on features from frames of the video clip may be used to predict, at 650, a temporal attention zone using the attention zone model 170-1. In some embodiments, the features and feature vectors may be weighed with, e.g., the features/feature vectors within the ground truth temporal attention zone may be weighed using a higher weight and that from frames outside of the temporal attention zone may have a lower weight. In addition, the weighted feature vectors may also be utilized to predict, at 660, an action label in accordance with the current action classification model 170-2. Such predictions using the current models 170 may then be compared with the ground truth temporal attention regions and action labels included in the training samples to determine discrepancies to be used in supervised learning. In some embodiments, different losses may be determined, respectively, with respect to temporal attention zone prediction and the action label prediction in training models 170-1 and 170-2 via back propagation. At the same time, both models may also be simultaneously optimized based on a joint loss function, determined at 670, that incorporates the losses from training each of the models, as discussed herein.

The training process is carried out one training sample at a time and the overall loss from training both models as determined based on the joint loss function. If the overall loss indicates convergence, as determined at 680, the training is completed at 695 and the models thus obtained may then be used on prediction for new video clips. If the overall loss indicates that no convergence, then then the overall loss may be used to determine, at 685, how to adjustment to parameters of the models in order to minimize the overall loss and then update, at 690, the current parameters of the models to incorporate the adjustment to update the models. With the updated models, the training proceeds to the next training sample to repeat the same steps 600-680 until convergence is achieved. The models obtained in this manner can be used to segment a video clip to identify a temporal attention region in the clip that corresponds to an event of interest as well as a classification of an action that occurred in the video that causes the event.

In summary, the present teaching discloses separate aspects related to using models to automatically detect event of interest in video clips based on models learned via machine learning. Models are trained to facilitate segmenting a video clip to obtain a temporal attention zone(s) with respect to a defined event of interest and detecting the type of an action occurred in the video clip that leads up to the event. As discussed herein, such models are trained based on supervised training data created according to the first aspect of the present teachings in a semi-automated manner based on historic video clips by detecting automatically both spatial and temporal regions in a video clip and assigning a label to an action observed from the video clip. Such created training data is used in training models in accordance with the second aspect of the present teachings as disclosed herein. During training, features extracted from spatial regions or an entire image in different frames are merged to generate group-based feature vectors indexed. In some embodiments, the indexing may be performed according to the ground truth temporal attention regions to facilitate supervised training. The action classification model is trained based on feature vectors, obtained either within the temporal attention zones or across all frames of the video clip sample, which improved the speed of learning as well as action label prediction quality.

Figure 7:
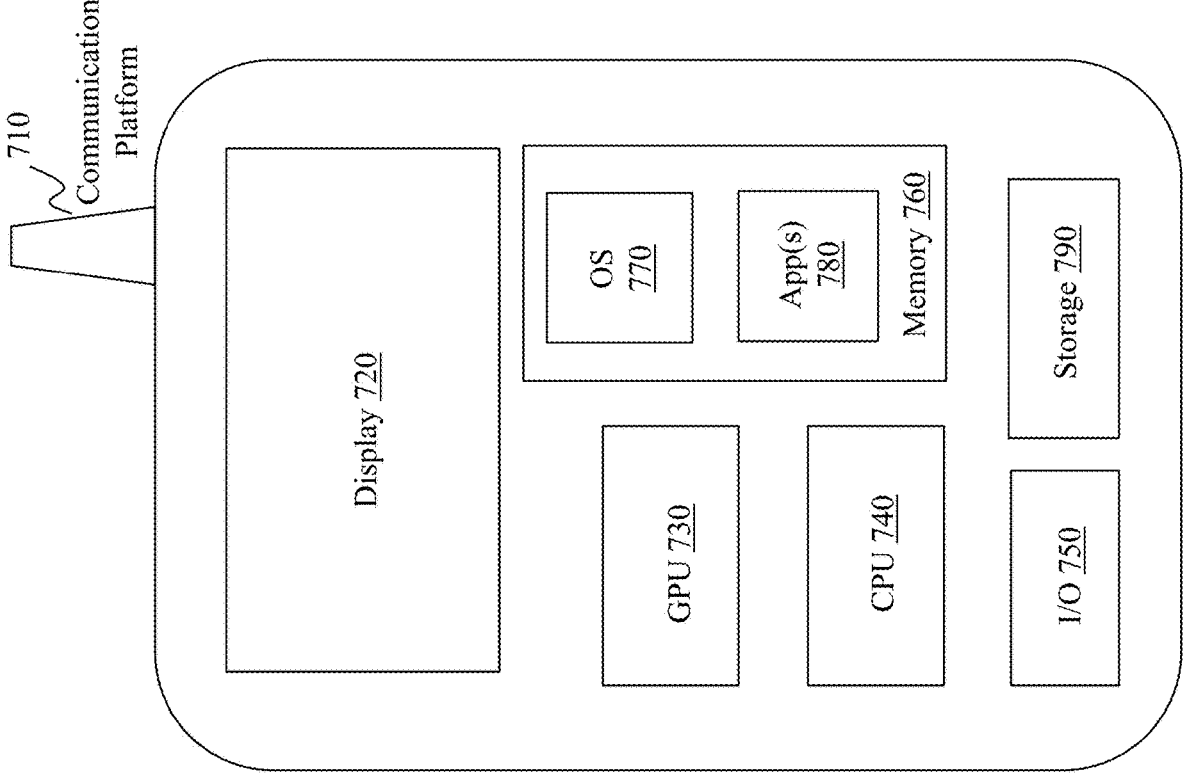
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a user interface or any other suitable mobile apps for information analytics and management according to the present teaching on, at least partially, the mobile device 700. User interactions, if any, may be achieved via the I/O devices 750 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
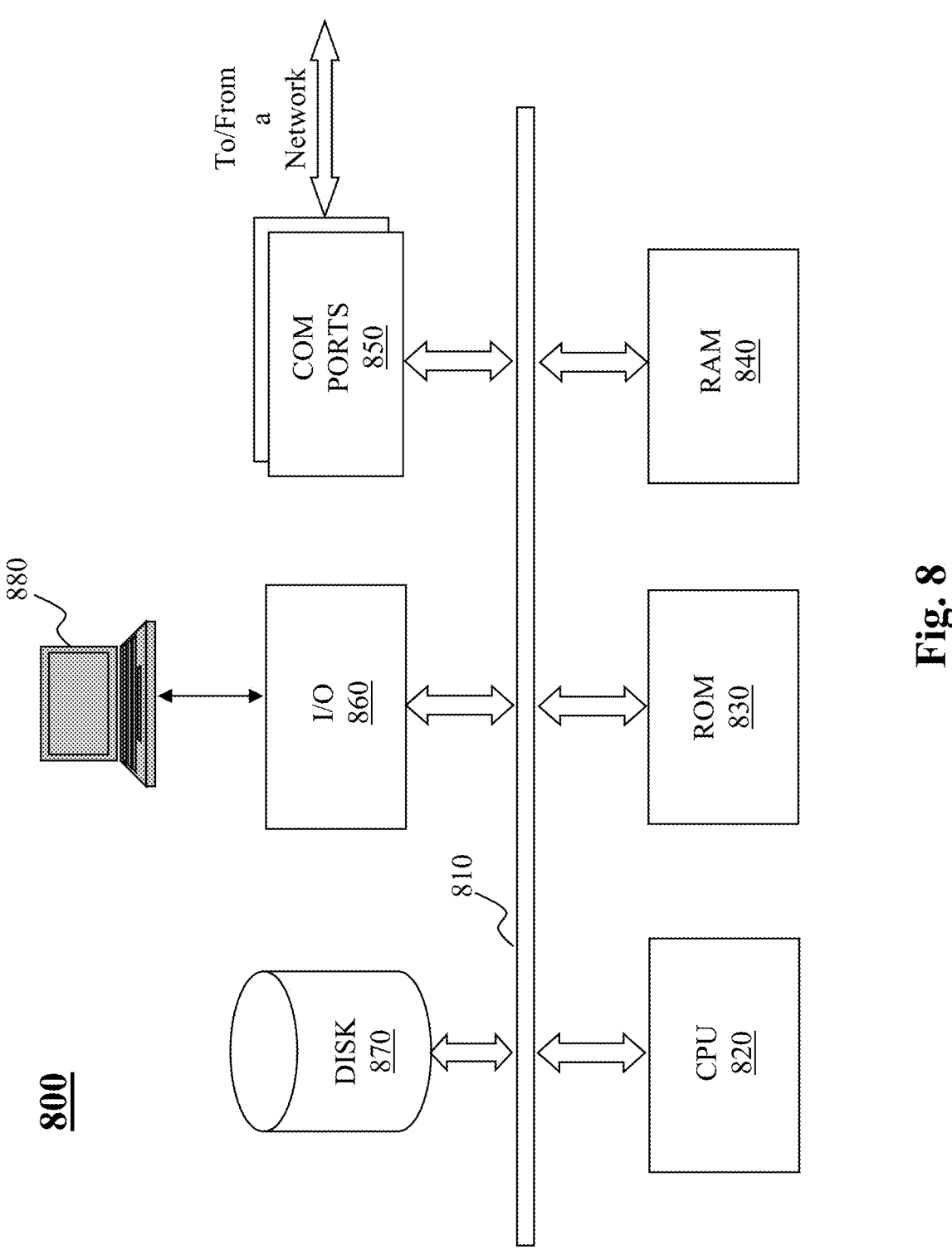
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, comprising:
receiving a plurality of historic video clips, each of which captures an event of interest;
with respect to each of the historic video clips,
identifying spatial attention regions in a plurality of frames of the historic video clip, wherein each of the spatial attention regions includes one or more objects that satisfy a first predetermined condition,
determining a temporal attention region in the historic video clip based on the identified spatial attention regions in accordance with a second predetermined condition,
labeling an action occurring within the temporal attention region that causes the event of interest; and
generating, based on the historic video clips, their respective spatial and temporal attention regions, and the respective action labels, training data for machine learning to train models used in automatically determining, from an input video clip, a temporal attention zone corresponding to an event of interest and classifying an action captured in the input video clip that causes the event of interest.

2. The method of claim 1, wherein
an event of interest corresponds to a scoring event in a sports game; and
the scoring event occurs when an action is performed in the sports game.

3. The method of claim 2, wherein
the scoring event includes a basket event in a basketball game; and
an action that causes a basket event includes one of dunk, layup, hoop, and 3-pointer.

4. The method of claim 3, wherein the step of identifying spatial attention regions comprises:

with respect to each of the plurality of frames in the historic video clip, detecting objects involved in the event of interest, retrieving the first predetermined condition in an action event configuration defining a spatial relationship among the detected objects within the frame, and identifying a spatial attention region in the frame that encompasses the detected objects when they satisfy the first predetermined condition.

5. The method of claim 4, wherein the first predetermined condition requires that the detected objects be within a certain distance.

6. The method of claim 2, wherein the step of determining at least one temporal attention region comprises:

identifying at least one key frame in the historic video clip according to the second predetermined condition defining a scoring event as the event of interest;

determining consecutive frames from the plurality of frames centering around the at least one key frame based on domain knowledge.

7. The method of claim 6, wherein the domain knowledge includes information on:

a frame rate of the historic video clip; and an estimated duration of the event of interest.

8. A machine readable and non-transitory medium having information recorded thereon, wherein the information, when read by the machine, causes the machine to perform the following steps:

receiving a plurality of historic video clips, each of which captures an event of interest;

with respect to each of the historic video clips, identifying spatial attention regions in a plurality of frames of the historic video clip, wherein each of the spatial attention regions includes one or more objects that satisfy a first predetermined condition, determining a temporal attention region in the historic video clip based on the identified spatial attention regions in accordance with a second predetermined condition, labeling an action occurring within the temporal attention region that causes the event of interest; and generating, based on the historic video clips, their respective spatial and temporal attention regions, and the respective action labels, training data for machine learning to train models used in automatically determining, from an input video clip, a temporal attention zone corresponding to an event of interest and classifying an action captured in the input video clip that causes the event of interest.

9. The medium of claim 8, wherein an event of interest corresponds to a scoring event in a sports game; and the scoring event occurs when an action is performed in the sports game.

10. The medium of claim 9, wherein the scoring event includes a basket event in a basketball game; and an action that causes a basket event includes one of dunk, layup, hoop, and 3-pointer.

11. The medium of claim 10, wherein the step of identifying spatial attention regions comprises:

with respect to each of the plurality of frames in the historic video clip, detecting objects involved in the event of interest, retrieving the first predetermined condition in an action event configuration defining a spatial relationship among the detected objects within the frame, and identifying a spatial attention region in the frame that encompasses the detected objects when they satisfy the first predetermined condition.

12. The medium of claim 11, wherein the first predetermined condition requires that the detected objects be within a certain distance.

13. The medium of claim 9, wherein the step of determining at least one temporal attention region comprises:

identifying at least one key frame in the historic video clip according to the second predetermined condition defining a scoring event as the event of interest;

determining consecutive frames from the plurality of frames centering around the at least one key frame based on domain knowledge.

14. The medium of claim 13, wherein the domain knowledge includes information on:

a frame rate of the historic video clip; and an estimated duration of the event of interest.

15. A system, comprising:

an S/T attention segmentation unit implemented using a processor and configured for:

receiving a plurality of historic video clips, each of which captures an event of interest, with respect to each of the historic video clips, identifying spatial attention regions in a plurality of frames of the historic video clip, wherein each of the spatial attention regions includes one or more objects that satisfy a first predetermined condition, determining a temporal attention region in the historic video clip based on the identified spatial attention regions in accordance with a second predetermined condition;

an action labeling unit implemented by a processor and configured for:

labeling an action occurring within the temporal attention region that causes the event of interest, and generating, based on the historic video clips, their respective spatial and temporal attention regions, and the respective action labels, training data for machine learning to train models used in automatically determining, from an input video clip, a temporal attention zone corresponding to an event of interest and classifying an action captured in the input video clip that causes the event of interest.

16. The system of claim 15, wherein an event of interest corresponds to a scoring event in a sports game; and the scoring event occurs when an action is performed in the sports game.

17. The system of claim 16, wherein the scoring event includes a basket event in a basketball game; and an action that causes a basket event includes one of dunk, layup, hoop, and 3-pointer.

18. The system of claim 17, wherein the step of identifying spatial attention regions comprises:

with respect to each of the plurality of frames in the historic video clip, detecting objects involved in the event of interest, retrieving the first predetermined condition in an action event configuration defining a spatial relationship among the detected objects within the frame, and identifying a spatial attention region in the frame that encompasses the detected objects when they satisfy the first predetermined condition.

19. The system of claim 16, wherein the step of determining at least one temporal attention region comprises:

identifying at least one key frame in the historic video clip according to the second predetermined condition defining a scoring event as the event of interest;

determining consecutive frames from the plurality of frames centering around the at least one key frame based on domain knowledge.

20. The system of claim 19, wherein the domain knowledge includes information on:

a frame rate of the historic video clip; and an estimated duration of the event of interest.

* * * * *